June 23, 1970     K. E. SANTUCCI     3,516,631
CABLE CLAMP
Original Filed Aug. 9, 1967     2 Sheets-Sheet 1
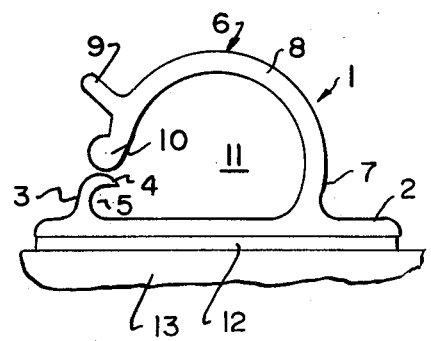
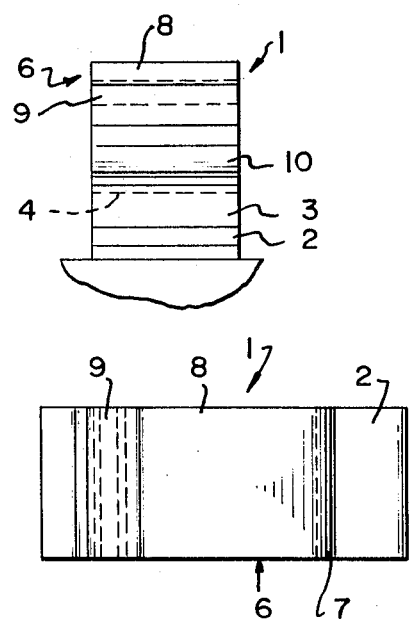
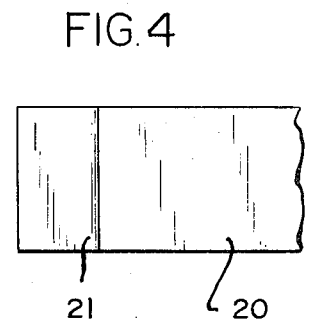
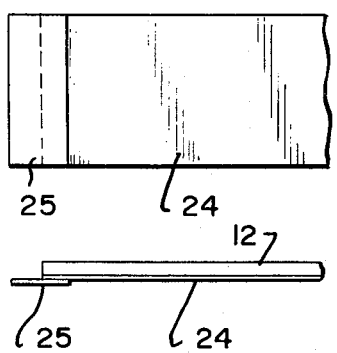
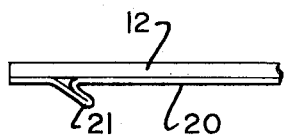
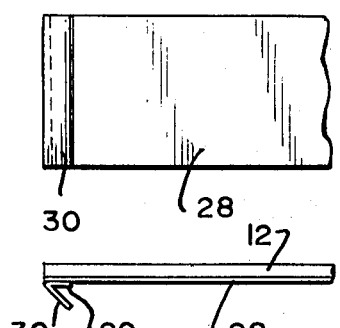
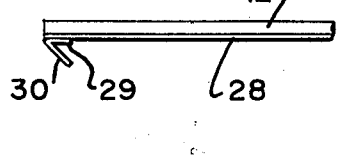
INVENTOR
KENNETH E. SANTUCCI
ATTORNEYS.

June 23, 1970 — K. E. SANTUCCI — 3,516,631
CABLE CLAMP
Original Filed Aug. 9, 1967 — 2 Sheets-Sheet 2
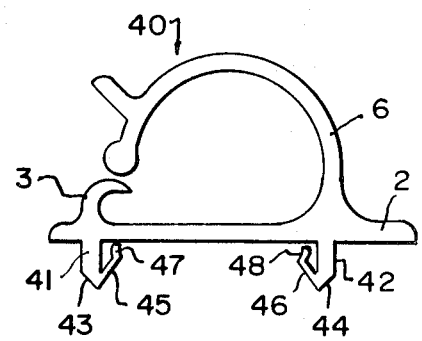
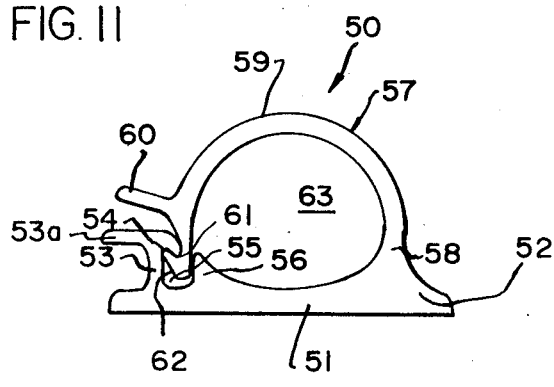
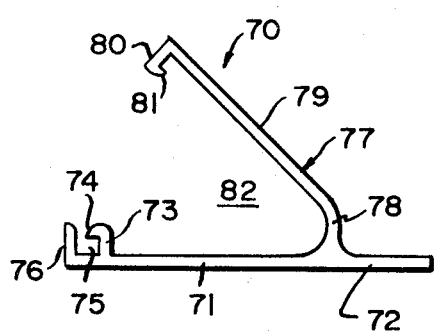
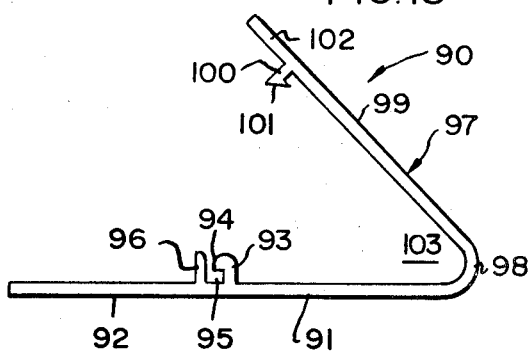
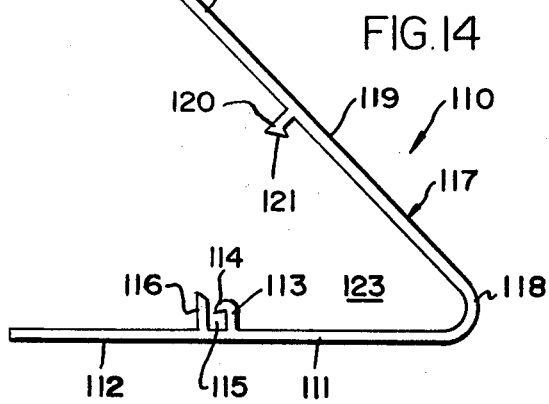
INVENTOR
KENNETH E. SANTUCCI
BY Petherbridge, O'Neill & Aubel.
ATTORNEYS United States Patent Office 3,516,631
Patented June 23, 1970

3,516,631
CABLE CLAMP
Kenneth E. Santucci, 1380 Edgewood,
Winnetka, Ill. 60621
Continuation of application Ser. No. 659,377, Aug. 9, 1967. This application July 28, 1969, Ser. No. 846,655
Int. Cl. F16l 3/08
U.S. Cl. 248—71                    7 Claims

ABSTRACT OF THE DISCLOSURE

A clamp device for mounting one or more cables on a suitable sub-structure. The clamp is provided with adhesive or mechanical means for securing the clamp to a sub-structure. The cable clamp includes at least a pair of legs which cooperate with a base member to provide a cable enclosure. This enclosure is open initially for the installation of a cable and can then be locked to positively retain the cable or cables. Locking members are provided on legs of the cable clamp to permit the formation of a complete cable retaining enclosure and levers are applied to some of the leg portions to facilitate the locking process.

---

This application is a continuation of application Ser. No. 659,377 filed Aug. 9, 1967 now abandoned.

The cable clamps of the invention are designed for broad applications where small, light-weight and relatively inexpensive die-electric cable clamps are required. The clamps of the invention are preferably made from a resilient, plastic material which is capable of being readily extruded or molded. This generally permits the utilization of readily available low-cost materials which can be used in mass production processes to greatly reduce the cost of such clamps.

Cable clamps made in accordance with the invention are designed for application to sub-structures in a variety of manners. The base of a clamp of the invention may be coated with a suitable contact resin or adhesive which will produce the positive securement of the clamp to a sub-structure when the clamp is pressed firmly onto such a structure.

To permit application of the adhesive to the cable clamp base at the manufacturing facility and to protect it during shipment and prior to use, it is found to be essential to place a protective strip of waxed or other type of paper over the adhesive. This protective strip will adhere to the adhesive but will not bond thereto. Upon removal of the protective strip, substantially all of the adhesive remains on the clamp base and essentially none is transferred to the strip.

Since relatively large quantities of the cable clamps of the invention are used in industry, it has found to be desirable to provide the protective strip with a tab or folded back portion to permit the strip to be readily gripped by an individual, and removed from the cable clamp base without the expiration of any significant period of time.

While the use of resins or adhesives has been found to be a highly desirable and effective way of securing the cable clamps of the invention to a supporting structure, mechanical means may also be employed. It has been found that in certain situations, it is desirable to provide one or more legs which project below the base of the cable clamp and which are ordinarily provided with resiliently responsive members, whereby the legs may be inserted into suitable slots or apertures and through the resilient response of the members can be permanently and mechanically locked to the sub-structure. In other instances, the bases may be extended in a manner such that the clamp may be screwed or bolted to a sub-structure without interference with the cable enclosure.

The clamps of the invention, themselves, generally consist of a pair of legs which extend from the base and are provided with locking elements which permit the legs to be interlocked to form a cable receiving and retaining enclosure between the interlocked legs and the base. In some of the embodiments of the cable clamp of the invention, the utilization of a third leg has been found to be helpful in providing a locking engagement between the locking elements of the leg which is of a more permanent nature. Clamps of this type are most useful in applications where there is little likelihood or necessity of removal of the cable from the clamp enclosure. In other embodiments of the cable clamp of the invention, levers are connected to at least one of the legs to assist in producing a quick, trouble-free interlock of the locking elements.

Various objects and advantages of the invention will hereinafter become more fully apparent from the following description of the drawings illustrating presently preferred embodiments thereof and wherein:

FIG. 1 is a side elevation of a cable clamp of the invention adhesively secured to a sub-structure;

FIG. 2 is a front elevation of the clamp of FIG. 1;

FIG. 3 is a top plan view of the cable clamp illustrated in FIG. 1;

FIG. 4 is a bottom view of the base portion of a cable clamp of the invention illustrating a form of protective strip applied to the adhesively coated clamp;

FIG. 5 is a side elevation of the illustration of FIG. 4;

FIG. 6 is a bottom view of a modified embodiment of a protective strip applied to a cable clamp of the invention;

FIG. 7 is a side elevation of the illustration of FIG. 6;

FIG. 8 is a bottom view of an alternate embodiment of a protective strip applied to a cable clamp of the invention;

FIG. 9 is a side elevation of the illustration of FIG. 8;

FIG. 10 is a side elevation of a modified embodiment of the cable clamp of the invention;

FIG. 11 is a modified embodiment of the cable clamp illustrated in FIG. 1 utilizing mechanical fastening means;

FIG. 12 is a side elevation of a further modification of a cable clamp of the invention;

FIG. 13 is a modification of the clamp illustrated in FIG. 12; and

FIG. 14 is a modified version of the cable clamp illustrated in FIG. 13.

The cable clamp of the invention, generally designated 1, as can be seen in FIGS. 1, 2 and 3, is formed with a generally flat rectangular base 2. A first leg 3 is shown projecting upwardly from base 2 in a direction generally normal thereto. As is clearly shown in FIGS. 2 and 3, the upwardly projecting first leg 3 is laterally elongated and extends substantially the entire width of the base 2. The upper extremity of this first leg is formed with a projection 4 which extends at an angle to the leg and generally parallel to the base to provide a first generally arcuate aperture or locking enclosure 5.

A second leg generally designated 6 has a first portion 7 which extends generally vertically upward from the base 2 and is disposed in generally parallel alignment with respect to first leg 3. The second portion 8 of second leg 6 comprises a continuation of the first portion and describes a generally arcuate configuration in side elevation as is illustrated in FIG. 1. A lever member 9 projects upwardly and outwardly from the second leg 6 near the extremity thereof. The extremity of the second portion 8 of the second leg is formed with a bulb enlargement 10 which has the configuration, in side elevation, of the major chord of a circle and is designed to coact with the locking enclosure 5 to lock the first leg 3 and the second leg 6 forming a cable retaining enclosure 11 between the locked legs and base 2. As can be seen in FIGS. 2 and 3, the elements of second leg 6 all extend laterally and substantially the full width of the base 2.

To facilitate the attachment of the cable clamp 1, which is ordinarily fabricated from a readily extruded or molded plastic material, to a supporting base member, a common contact adhesive or resin is applied to the flat rectangular base portion of the cable clamp opposite the surface thereof from which the legs 3 and 6 project. This adhesive is preferably of a character such that the exertion of pressure upon the body of the clamp against a supporting structure will serve to effect the securement of the cable clamp 1 to a sub-structure 13. Good results have been obtained utilizing either a vinyl or polyurethane closed cell foam carrying a transparent, long aging, high tack adhesive manufactured by Minnesota Mining and Manufacturing Co. under the trade designation of "Scotch-Mount" brand double-coated foam tape with DS-4 adhesive formulation.

This cable clamp of the invention therefore can be taken from stock and pressed against a suitable mounting substructure, such as 13, which will serve to produce a sufficient curing of the resin or contact adhesive 12 to effect the securement of the clamp to the sub-structure.

One or more cable elements may be introduced into the enclosure 11 by manually grasping the lever 9 and pulling it back slightly to permit the introduction of the cable elements between the projection 4 of leg 3 and the bulb 10 of leg 6. When these cable elements have been placed in the enclosure 11, lever 9 of the leg 6 may be used to assist in firmly depressing leg 6 downwardly and slightly back towards portion 7 of the leg until the bulb 10 is permitted to be resiliently inserted into the aperture or locking enclosure 5 wherein it is resiliently retained by the tension in leg 6.

Referring now to FIGS. 4 through 9, several variations of protective sheets or strips are shown secured to the resin or contact adhesive coating 12 applied to a cable clamp of the type illustrated in FIGS. 1, 2 and 3. This protective strip is designed primarily to keep dust, dirt, grease and other materials from contacting exposed adhesive in a manner such that they would adversely affect the curing or bonding efficiency of the resin or adhesive when the cable clamp is installed on the proper sub-structure.

FIGS. 4 and 5 illustrate a protective sheet or strip 20 applied over an exposed resin or contact adhesive surface 12. This strip is ordinarily fabricated from a paraffin or plastic impregnated paper, or plastic sheet which will readily adhere to the adhesive but which is of a character such that it will not react in the presence of the adhesive to produce any kind of permanent bond between the strip 20 and the adhesive 12. The strip also has the property of being removable from the adhesive while carrying essentially no adhesive material with it when it is removed and leaving the adhesive material in a substantially undisturbed condition.

While a protective strip such as 20 can be applied to the adhesive coating on a clamp such as the cable clamp 1, it has been found to be somewhat difficult and time-consuming in the field to remove such strips from the adhesive coating without damaging the coating. This has been overcome in the protective strip 20, illustrated in FIG. 4, by provision of a crease 21 in the strip which extends laterally across the adhesive coated clamp surface and is doubled back upon itself, as is best seen in FIG. 5, in a manner such that the strip may be rapidly pulled from the adhesive 12 and the clamp secured to a sub-structure. This is quite significant in the field where workers install large numbers of such clamps in short periods of time, and where it becomes quite costly for a worker to spend time using a fingernail or other appliance to lift the edge of the protective strip to remove it from the adhesive coating.

The illustrations in FIGS. 6 through 9 show modified embodiments of a protective strip gripping structure. Referring particularly to FIGS. 6 and 7, a protective strip 24 is secured to the exposed surfaces of a resin or contact adhesive coating. The strip material may be of a type similar to that described with respect to FIGS. 4 and 5. One extremity of the strip 24 in this instance is provided with a tab 25 which projects from the extremity of the strip and of the adhesive coating 12 on the cable clamp to which it is applied. This tab 25 provides a means for readily grasping a portion of protective strip to accomplish the removal of the strip from the adhesive coating.

FIGS. 8 and 9 illustrate a protective strip applied over and secured to an exposed surface of a resin or contact adhesive 12. In this instance, one of the extremities of the strip 28 is provided with a tab 29 secured adjacent to such extremity and having a bent back portion 30 to facilitate the manual gripping of the strip and permitting the removal from the adhesive coating.

FIG. 10 illustrates a cable clamp having a base and super-structure, generally designated 40, which is similar in all material respects to that illustrated in FIG. 1. However, in this cable clamp embodiment, the adhesive coating applied to the under side of base 2 may be eliminated if desired.

Cable clamp 40 is provided with a pair of generally vertically downwardly projecting legs 41 and 42, which project downwardly from base 2 from points generally adjacent to first leg 3 and second leg 6 which project generally upwardly from the base portion 2. Ordinarily, the legs 41 and 42 extend the full width of the underside of the rectangular base 2. In some applications, however, these leg portions may be reduced in size or provided with cut-out portions in a manner such that each of the legs 41 and 42 comprise a plurality of vertically extending spaced legs.

The lower extremity of each of the legs 41 and 42 is beveled at 43 and 44 to facilitate their insertion in apertures or slots provided in the sub-structure to which the clamp is to be mounted. Extending downwardly from the extremities of the spaced legs 41 and 42 are resilient projections 45 and 46, respectively, which extend at a generally acute angle with respect to the longitudinal axis of each of the legs 41 and 42, and which include inwardly directed arcuate extensions 47 and 48, respectively.

Since the material of the cable clamp itself is of a resilient plastic nature, the projections 45 and 46 and their respective extensions 47 and 48, which are of relatively small cross sections, are quite resilient. Therefore, when the legs 41 and 42 are introduced into preformed apertures or slots in a mounting sub-structure, the legs 41 and 42 and appurtenances may be readily reduced in cross sectional dimension as the projections and extensions 45–57 and 46–48 are compressed. When the clamp is in the desired position, the resilient projections and extensions will serve to securely hold the clamp 40 to the desired sub-structures.

The drawings of FIGS. 11 through 14 illustrate modified embodiments of the cable clamps 1 and 40 of FIGS. 1 and 10, respectively, and of the locking means illustrated in relationship thereto. FIG. 11 shows a cable clamp generally designated 50. The clamp 50 includes a base 51 which, in this instance, is provided with a longitudinal extension 52 to afford a means for mechanically securing the cable clamp to a separate structure by a device such as a screw or a bolt (not shown). Both the base 51 and the extension 52 are formed with an enlarged cross-section to minimize vertical deflection when subjected to vertical strain. This enhances clamp adherence to a sub-structure by preventing the undesired lifting of the bottom surface of the clamp for a sub-surface to which it is adhesively secured. The clamp 50 of FIG. 11 is provided with a first leg 53, which projects generally vertically from the base 51, and is provided with an integrally formed generally horizontally extending lever 53a. The upper extremity of this first leg 53 is provided with a downwardly extending hook-like projection 54 which is designed to serve as a first locking means. Spaced slightly from the first leg and separated therefrom by a channel 55 is a second generally vertically projecting leg 56. This leg serves to cooperate with the first leg and the hook-like projections 54 thereof to produce and maintain a positive lock.

The clamp of FIG. 11 is also formed with a third leg generally designated 57. This leg includes a lower first portion 58 which projects from base 51 generally vertically upwardly therefrom and in parallel relationship with legs 53 and 56. The third leg 57 includes a second portion 59 which comprises a continuous extension of the first lower leg portion 58 and is disposed in a generally arcuate configuration with respect to the base 51. Leg 57 also includes a lever operator 60 which serves a function similar to that of lever 9 of FIG. 1 and acts cooperably with lever 53a to close the clamp. The extremity of the third leg 57 is constricted at 61 below which the leg is provided with a locking hook 62 which has a portion extending back over the constricted portion 61 of the leg 57. After one or more cables have been inserted in through the originally open enclosure 63 formed by the base 51 and the legs 53 and 57, the lever 60 is depressed forcing the exterior complementing inclined surfaces of hook-like projection 54 and locking hook 62 to slide over one another until the locking hook 62 at the extremity of third leg 57 enters channel 55 between first leg 53 and second leg 56. Upon release of the lever operator 60, leg 57 is permitted to resiliently respond to the release by permitting the locking hook to rise in channel 55 guided by second leg 56 into locking engagement with hook-like projection 54 of first leg 53. The enclosure 63 is now complete.

Through the assistance of second leg 56, the accidental dislodgement of the locking elements through the bumping or jarring of the clamp is prevented. The second leg 56 will effectively resist movement in the direction of the longitudinal axis of the base. This clamp therefore provides a positive lock between the legs forming the enclosure 63 and provides a reliable cable clamp. If it is desired to open the clamp by releasing locking hook 62 from engagement with locking projection 54, lever 53a is depressed to open channel 55 to permit the release of the lock by raising lever 60.

FIG. 12 illustrates a modified embodiment of the cable clamps shown in FIGS. 1, 10 and 11. FIG. 12 shows a cable clamp, generally designated 70 which includes a base 71 having a longitudinal extension 72 for the mechanical connection of the clamp to a suitable sub-structure. Projecting from the base 71 is a first leg 73 which has a generally laterally extending hook-like projection 74. The projection 74 provides a recess and channel 75 adjacent which a second leg 76 projects generally vertically upwardly from the base 71. The first and second legs 73 and 76 in combination with the generally lateral hook-like projection 74 and channel 75 provide a first cable clamp locking element. A third leg, generally designated 77 has a first portion 78 which extends generally vertically upwardly from the base 71 and in parallel alignment with both of the legs 73 and 76. The legs 77 has a second portion 79 which serves substantially as a continuous extension of the first portion 78. The extremity of leg 77 and second portion 79 thereof is formed with a flange member 80 which projects downwardly from the leg 77 and towards base 71. The end of this flange 80 is provided with a hook-like projection 81 which extends from the flange 80 and towards the first portion 78 of leg 77. The flange 80 and hook-like projection 81 serve to provide the second element of the locking means of clamp 70.

After one or more cables have been introduced into the clamp between the base 71 and the third leg 77, the second portion 79 of leg 77 can be depressed until the flange 80 and hook-like projection 81 have been introduced into the channel 75 and permitted to resiliently respond to produce the lock between complementing projections 74 and 81 and to provide a substantially rectangular enclosure 82 between the legs of the clamp and the base of the clamp.

FIG. 13 illustrates a modification of the cable clamp shown in FIG. 12. This cable clamp, generally designated 90 which includes a base 91 having a longitudinal extension 92, which extends in a direction opposite that of the FIG. 12 clamp, for the mechanical connection of the clamp to a suitable substructure. Projecting from the base 91 is a first leg 93 which has a generally laterally extending hook-like projection 94. The projection 94 provides a recess and channel 95 adjacent which a second leg 96 projects generally vertically upwardly from the base 91. The first and second legs 93 and 96 in combination with the generally lateral hook-like projection 94 and channel 95 provides a first cable clamp locking element. A third leg, generally designated 97 has a first portion 98 which extends generally vertically upwardly from the base 91 and in parallel alignment with both of the legs 93 and 96. The legs 97 has a second portion 99 which serves at a substantially continuous extension of the first portion 98. Near the extremity of leg 97 and second portion 99 thereof, a flange member 100 is formed which projects downwardly from the leg 97 and toward base 91. The end of this flange 100 is provided with a hook-like projection 101 which extends from the flange 100 and toward the first portion 98 of leg 97. The flange 100 and hook-like projection 101 serve to provide the second locking element of the cable clamp 90.

After one or more cables have been introduced into the clamp between the base 91 and the third leg 97, the second portion 99 of leg 97 can be depressed utilizing lever extension 100 of leg 97 until the flange 100 and hook-like projection 101 have been introduced into the chamber 95. The clamp legs are permitted to resiliently respond to produce a positive lock between complementing projections 94 and 101 and to provide an essential rectangular enclosure 103 between the legs of the clamp and the base of the clamp.

FIG. 14 illustrates a modification of the cable clamps shown in FIGS. 12 and 13. FIG. 14 shows a cable clamp, generally designated 110 which includes a base 101 having a longitudinal extension 102 for the mechanical fastening of the clamp to a suitable substructure. Projecting from the base 101 is a first leg 113 which has a generally laterally extending hook-like projection 114. The projection 114 provides a recess and channel 115 adjacent which a second leg 116 projects generally vertically upwardly from the base 111. The first and second legs 113 and 116, in combination with the generally lateral hook-like projection 114 and channel 115, provides a first cable clamp locking element. A third leg, generally designated 117 has a first portion 118 which extends generally vertically upwardly from the base 111 and in general parallel alignment with both of the legs 113 and 116. The legs 117 has a second portion 119 which serves substantially as a continuous extension of the first portion 118. Near the extremity of leg portion 119 of leg 117, a flange member 120 is formed which projects downwardly from the leg 117 and toward base 111. The end of this flange 120 is provided with a hook-like projection 121 which extends from the flange 120 and toward the first portion 118 of leg 117. The flange 120 and hook-like projection 121 serve to provide the second element of the locking means of clamp 110.

After one or more cables have been introduced into the clamp between the base 111 and the third leg 117, the second portion 119 of leg 117 can be depressed utilizing the enlarged lever extension 122 of leg 117, until the flange 120 and hook-like projection 121 have been introduced into the channel 115. The clamp elements are permitted to resiliently respond to produce a secure lock between complementing projections 114 and 121 and to provide a generally rectangular enclosure 123 between the legs of the clamp and the base of the clamp. The lever extension 122 is of a sufficient magnitude in this embodiment of the invention to promote disengagement of the lock as well as locking engagement of the clamp elements.

Various modes of carrying out the invention are contemplated as being within the scope of the following claims particularly pointing out and distinctly claiming the subject matter which is regarded as the invention:

I claim:

1. A cable clamp for retaining a cable segment in a preselected position comprising a base, a first leg formed integral with the base and having a first portion projecting therefrom, the first leg being doubled back over the base and having a second major portion thereof spaced from the base, the first leg being provided with a first locking means on the second major portion thereof, a second leg formed integral with the base and having a first portion projecting from the base in a direction generally parallel to the first portion of the first leg, a third leg formed integral with and connected to the first portion of the second leg and having a major portion thereof projecting in generally parallel spaced relationship with the distal end portion of the first portion of the second leg and defining a channel therebetween, the extremity of one of the second or third legs being bent back to project into the channel and between the legs thereof at substantially an acute angle with respect to the longitudinal axis of said leg to provide a second hooked locking means, the first locking means on the first leg comprising an extremity of the second major portion bent back with respect to the longitudinal axis thereof at substantially an acute angle with respect to said longitudinal axis to provide a hook structure thereon, the hook structure of the first leg having hook surfaces complementing the hook surfaces defined by the acute angle of the second locking means, the bent back hook structure of the first locking means being insertable in the channel between the second and third legs and positively engageable with the bent back hook structure of the second locking means to produce a secure lock of the cable retaining enclosure, the lock between the hook structures being maintained by the leg disposed in parallel spaced relationship with the hook structure of the second or third leg.

2. The cable clamp of claim 1 wherein lever means are provided on the one of the second or third legs carrying a hook structure, the lever extending from said leg and opposite the other leg, the lever being manually depressible to raise the hook structure adjacent thereto to permit disengagement of the lock of the cable retaining enclosure.

3. The cable clamp of claim 1 wherein lever means are provided on the first leg, said lever means being manually accessible to augment the secure locking of the hook structure.

4. The cable clamp of claim 1 wherein first manually accessible lever means are provided on one of the second or third legs and second manually accessible lever means are provided on the first leg to augment the opening and closing of the locking means.

5. The cable clamp of claim 1 wherein an adhesive material is applied to a side of the base opposite the side from which the first and second legs project to provide a means for securing the cable clamp to another structure.

6. The cable clamp of claim 1, wherein extension means are formed integral with the base and projecting therefrom to provide for the mechanical fastening of the clamp to another structure.

7. A cable clamp for retaining a cable segment in a preselected position comprising a base, a first leg formed integral with the base and having a first portion projecting therefrom, the first leg being doubled back over the base and having a second major portion thereof spaced from the base, the first leg being provided with a first locking means on the second major portion thereof, a second leg formed integral with the base and having a first portion projecting from the base in a direction generally parallel to the first portion of the first leg, the extremity of the second leg being sent back at substantially an acute angle with respect to the longitudinal axis of said leg to provide a second hooked locking means, the first locking means on the first leg comprising an extremity of the second major portion bent back with respect to the longitudinal axis thereof at substantially an acute angle with respect to said longitudinal axis to provide a hook structure thereon, the hook structure of the first leg having hook surfaces complementing the hook surfaces defined by the acute angle of the second locking means, the bent back hook structure of the first locking means being positively engageable with the bent back hook structure of the second locking means to produce a secure lock of the cable retaining enclosure, a first lever means provided on the first leg carrying a hook structure, the lever extending from said leg and opposite the other leg, the lever being manually depressible to raise the hook structure adjacent thereto to permit disengagement of the lock of the cable retaining enclosure, and a second lever means provided on the second leg adjacent the hook structure thereof, said lever means being manually accessible to augment the secure locking and separation of the hook structure in cooperation with the first lever means.

References Cited

UNITED STATES PATENTS

| | | | |
|---|---|---|---|
| D. 190,787 | 6/1961 | Schneider | 248—74 X |
| 2,345,485 | 7/1944 | Slaughter | 248—74 X |
| 2,682,385 | 6/1954 | Schluter | 248—71 X |
| 3,074,677 | 1/1963 | Eckhardt | 248—74 |
| 3,090,826 | 5/1963 | Cochran | 248—74 X |
| 3,146,778 | 9/1964 | Krawiec | 248—74 X |
| 3,157,377 | 11/1964 | Orenick | 248—71 |
| 3,188,030 | 6/1965 | Fischer | 24—73.7 X |
| 3,210,030 | 10/1965 | Ramsey | 248—71 |
| 3,381,884 | 6/1968 | Herrity | 229—51 |

FOREIGN PATENTS 1,022,820  3/1966  Great Britain.

CHANCELLOR E. HARRIS, Primary Examiner

U.S. Cl. X.R.

248—205, 220.5; 24—73.7